(12) United States Patent
Suzuki et al.

(10) Patent No.: US 11,508,998 B2
(45) Date of Patent: Nov. 22, 2022

(54) BATTERY PACK AND ELECTRONIC DEVICE

(71) Applicant: Sony Corporation, Tokyo (JP)

(72) Inventors: Kuniharu Suzuki, Tokyo (JP); Hidetoshi Akasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 113 days.

(21) Appl. No.: 16/977,101

(22) PCT Filed: Dec. 27, 2018

(86) PCT No.: PCT/JP2018/048204
§ 371 (c)(1),
(2) Date: Sep. 1, 2020

(87) PCT Pub. No.: WO2019/171729
PCT Pub. Date: Sep. 12, 2019

(65) Prior Publication Data
US 2020/0411920 A1 Dec. 31, 2020

(30) Foreign Application Priority Data
Mar. 8, 2018 (JP) .............................. JP2018-042307

(51) Int. Cl.
*H01M 10/48* (2006.01)
*H01M 50/202* (2021.01)
(Continued)

(52) U.S. Cl.
CPC ....... *H01M 10/486* (2013.01); *H01M 10/425* (2013.01); *H01M 10/48* (2013.01); *H01M 10/653* (2015.04); *H01M 10/6551* (2015.04); *H01M 50/202* (2021.01); *H01M 50/209* (2021.01); *H01M 50/231* (2021.01);
(Continued)

(58) Field of Classification Search
CPC .. H01M 10/486; H01M 10/425; H01M 10/48; H01M 10/653; H01M 10/6551; H01M 10/443; H01M 10/61; H01M 10/623; H01M 10/647; H01M 50/202; H01M 50/209; H01M 50/231; H01M 50/284; H01M 50/581; H01M 50/236; H01M 50/569; H01M 2200/10; H01M 2220/30;
(Continued)

(56) References Cited

U.S. PATENT DOCUMENTS

| 6,844,105 B1 | 1/2005 | Hanafusa et al. |
| 2012/0183819 A1 | 7/2012 | Yamamoto et al. |
| 2017/0003175 A1 | 1/2017 | Sakaguchi |

FOREIGN PATENT DOCUMENTS

| EP | 2413400 A2 | 2/2012 |
| JP | H10327540 A | 12/1998 |

(Continued)

OTHER PUBLICATIONS

International Search Report and Written Opinion dated Mar. 19, 2019 for PCT/JP2018/048204 filed on Dec. 27, 2018, 7 pages including English Translation of the International Search Report.

*Primary Examiner* — Eugenia Wang
(74) *Attorney, Agent, or Firm* — Xsensus LLP

(57) ABSTRACT

A temperature detection element is allowed to more accurately detect a temperature of a battery pack.
A battery pack includes: a battery cell; a temperature detection element; and a thermally conductive member transferring heat of the battery cell to the temperature detection element.

12 Claims, 7 Drawing Sheets

(51) Int. Cl.
*H01M 10/6551* (2014.01)
*H01M 10/653* (2014.01)
*H01M 50/209* (2021.01)
*H01M 10/42* (2006.01)
*H01M 50/231* (2021.01)
*H01M 50/284* (2021.01)
*H01M 50/581* (2021.01)

(52) U.S. Cl.
CPC ....... *H01M 50/284* (2021.01); *H01M 50/581* (2021.01); *H01M 2200/10* (2013.01); *H01M 2220/30* (2013.01)

(58) Field of Classification Search
CPC ....... H01M 10/60–6557; H01M 50/20; H01M 50/211; H01M 50/287
See application file for complete search history.

(56) References Cited

FOREIGN PATENT DOCUMENTS

| | | |
|---|---|---|
| JP | 2002-260608 A | 9/2002 |
| JP | 2006-236966 A | 9/2006 |
| JP | 2012-150991 A | 8/2012 |
| WO | 2001/045184 A1 | 6/2001 |

BATTERY PACK AND ELECTRONIC DEVICE

CROSS-REFERENCE TO RELATED APPLICATIONS

The present application is based on PCT filing PCT/JP2018/048204, filed Dec. 27, 2018, which claims priority to JP 2018-042307, filed Mar. 8, 2018, the entire contents of each are incorporated herein by reference.

TECHNICAL FIELD

The present disclosure relates to a battery pack and an electronic device.

BACKGROUND ART

Various portable electronic devices, such as mobile phones typical ones of which are smartphones, tablet computers, and the like, have been known. Secondary batteries that can be repeatedly charged and discharged are used for these mobile devices. As one mode of such secondary batteries, lithium-ion secondary batteries are widely used because of various advantages, such as high voltage, high energy density, long cycle life, quick charging, and the like.

A lithium-ion secondary battery is generally used in the form of a battery pack including a battery cell and a built-in protection circuit. The protection circuit has a function of protecting the battery from, for example, overcharge, overcurrent, or overdischarge. In such a battery pack, a temperature detection element for detecting a temperature of the battery pack is mounted on a circuit board. In a case where the detected temperature deviates from recommended temperatures, the battery pack stops charging or temporarily suspends charging, or lowers a voltage at a time of charging to secure safety of the battery and to decrease deterioration of the battery (see Patent Document 1, for example).

CITATION LIST

Patent Document

Patent Document 1: Japanese Patent Application Laid-Open No. 2012-150991

SUMMARY OF THE INVENTION

Problems to be Solved by the Invention

However, a battery pack may receive heat at a position distant from a position where a temperature detection element mounted on a circuit board is disposed, and a temperature of a battery cell may rise. In this case, there is a possibility that a difference occurs between a temperature at the position where the heat is received and a temperature at the position where the temperature detection element is disposed, a temperature of the battery pack may not be correctly detected, and controls of charging may not be appropriately performed.

Therefore, the present disclosure proposes a new and improved battery pack and electronic device that allow a temperature detection element to more accurately detect a temperature of the battery pack.

Solutions to Problems

The present disclosure provides a battery pack including: a battery cell; a temperature detection element; and a thermally conductive member transferring heat of the battery cell to the temperature detection element.

Furthermore, the present disclosure provides an electronic device including: a battery pack including a battery cell; a temperature detection element; and a thermally conductive member transferring heat of the battery cell to the temperature detection element.

Effects of the Invention

As described above, the present disclosure allows a temperature detection element to more accurately detect a temperature of a battery pack.

Note that the above effects are not necessarily limiting. In addition to or instead of the above effects, any of effects described in the present specification or other effects that can be grasped from the present specification may be obtained.

MODE FOR CARRYING OUT THE INVENTION

Figure 1:
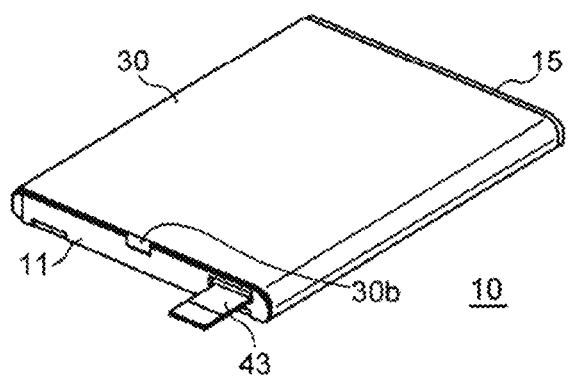
FIG. 1 is a perspective view illustrating an appearance of a battery pack according to a first exemplary embodiment of the present disclosure.

Hereinafter, preferred exemplary embodiments of the present disclosure will be described in detail with reference to the accompanying drawings. Note that in the present specification and the drawings, components having substantially the same function and configuration are denoted by the same reference numeral, and redundant description is omitted.

Note that the description will be made in the following order.

1. FIRST EXEMPLARY EMBODIMENT
1.1. CONFIGURATION EXAMPLE OF BATTERY PACK
1.2. CONFIGURATION EXAMPLE OF ELECTRONIC DEVICE
2. SECOND EXEMPLARY EMBODIMENT
3. THIRD EXEMPLARY EMBODIMENT

In the present specification, a structure that includes a battery element and has not been coated with a thermally conductive laminate sheet is referred to as a battery cell. The battery cell connected to a circuit board and to which a thermally conductive laminate sheet, a top cover, and a bottom cover are attached is referred to as a battery pack. Furthermore, a side of the battery pack and the battery cell from which a positive terminal and a negative terminal protrude is referred to as a top portion. A side of the battery pack and the battery cell facing the top portion is referred to as a bottom portion. The other portions of the battery pack and the battery cell are referred to as side portions. Moreover, a length in a direction of both the side portions may be referred to as a width. A length in a direction of the top portion—the bottom portion may be referred to as a height.

1. First Exemplary Embodiment

1.1. Configuration Example of Battery Pack

Figure 2:
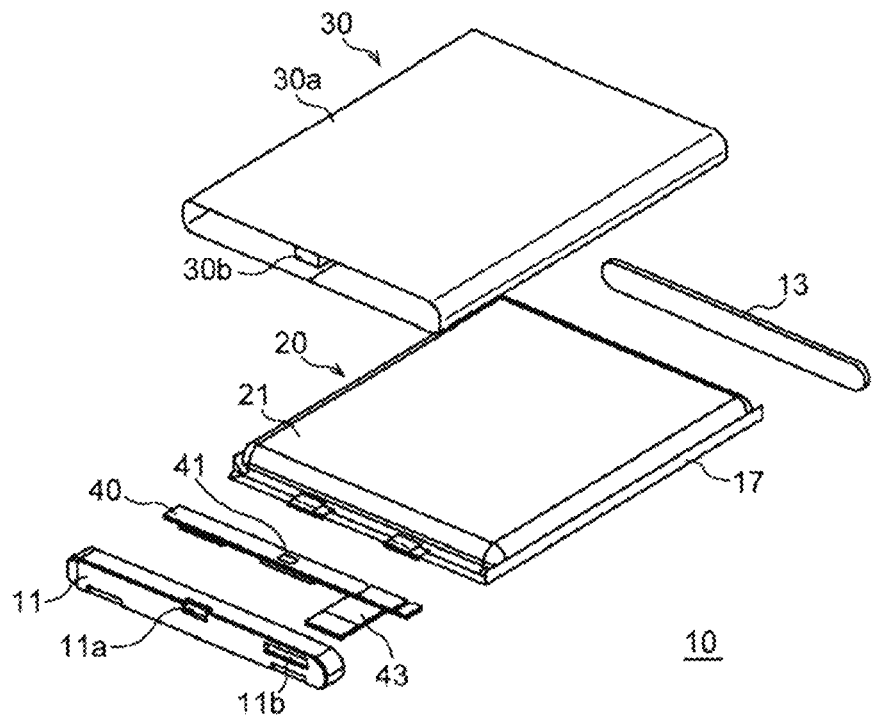
FIG. 2 is an exploded perspective view illustrating a configuration example of the battery pack according to the exemplary embodiment.

A configuration example of a battery pack according to a first exemplary embodiment of the present disclosure will be described. First, a configuration example of a battery pack 10 according to the present exemplary embodiment will be described with reference to FIGS. 1 to 2. FIG. 1 is a perspective view illustrating an appearance of the battery pack 10. FIG. 2 is an exploded perspective view illustrating the configuration example of the battery pack 10.

The battery pack 10 is, for example, a prismatic or flat lithium-ion polymer secondary battery pack. As illustrated in FIG. 2, the battery pack 10 includes a battery cell 20, a top cover 11, a bottom cover 13, a circuit board 40, and a thermally conductive laminate sheet 30. The battery cell 20 includes a battery element 21 electrically connected to the circuit board 40. The thermally conductive laminate sheet 30 is wound around and adhered to a periphery of the battery cell 20. Openings are formed at a top portion and a bottom portion of the battery cell 20 around which the thermally conductive laminate sheet 30 is wound. The top cover 11 is attached to the opening at the top portion. The bottom cover 13 is attached to the opening at the bottom portion.

Note that an electrically insulating adhesive sheet or the like for fixing the circuit board 40 and the top cover 11 is not illustrated.

Battery Cell

The battery cell 20 includes the battery element 21 including a positive terminal (not illustrated) and a negative terminal (not illustrated) that protrude from one end side. The battery element 21 is placed on a support plate 17. The battery element 21 may be contained in, for example, a soft laminate film. The battery cell 20 is formed in a shape like a relatively thin plate to cope with downsizing or thinning of electronic devices.

The battery element 21 is a laminate that includes a positive electrode, a separator, a negative electrode disposed opposite the positive electrode, and a separator that are laminated in this order. The battery element 21 may be a wound battery element that includes a wound laminate that has a shape like a band. The positive terminal is connected to the positive electrode of the battery element 21. The negative terminal is connected to the negative electrode of the battery element 21. Such a battery element 21 may be a known battery element.

Circuit Board

The circuit board 40 is disposed on the top portion (side) of the battery cell 20 that has a shape like a plate. The circuit board 40 is fixed to the battery cell 20 with an adhesive insulating sheet (not illustrated). On the circuit board 40, a temperature detection element 41, a fuse (not illustrated), and a thermal sensitive resistor (not illustrated) are mounted. Furthermore, the circuit board 40 is connected to a flexible circuit board 43 connected to a device main body of an electronic device. The temperature detection element 41 is mounted on the center of the circuit board 40 in a width direction of the circuit board 40. The flexible circuit board 43 is mounted on a side portion of the circuit board 40 in the width direction of the circuit board 40.

On the circuit board 40, a protection circuit including the fuse, the thermal sensitive resistor, and the temperature detection element 41 is formed, and a plurality of contacts (not illustrated) is formed. The protection circuit includes a charging-controlling field effect transistor (FET) and a discharging-controlling FET that are not illustrated, an integrated circuit (IC) not illustrated, and the like. The IC monitors the secondary battery and controls the charging-controlling FET and the discharging-controlling FET.

The temperature detection element 41 is, for example, a thermistor, and has electric resistance that varies according to a change in a temperature of the temperature detection element 41. The protection circuit monitors a temperature detected by the temperature detection element 41. In a case where the detected temperature exceeds a preset threshold, the protection circuit turns off the charging-controlling FET to inhibit or suspend charging, or lowers a voltage at a time of charging by transmitting temperature information to a charging circuit installed in, for example, a device-main-body side.

The thermal sensitive resistor is, for example, a positive temperature coefficient (PTC: PTC element), and is connected in series to the battery element 21. When a temperature of the thermal sensitive resistor becomes higher than a set temperature, electric resistance of the thermal sensitive resistor rapidly increases and an electric current that flows into the battery is substantially cut off. The fuse is connected in series to the battery element 21. When an overcurrent flows through the battery element 21, the fuse is blown by an electric current of the fuse, and the electric current is cut off. Furthermore, a heater resistor is disposed near the fuse.

When an overvoltage occurs, a temperature of the heater resistor rises, and thus the fuse is blown, and the electric current is cut off.

Furthermore, when a terminal voltage of the battery cell 20 rises, there is a possibility that heat, ignition, or the like is generated. Therefore, the protection circuit monitors a voltage of the battery cell 20. In a case of an overcharge state in which the voltage rises, the protection circuit turns off the charging-controlling FET to inhibit charging. Moreover, when a terminal voltage of the battery cell 20 becomes 0 V due to an overdischarge state in which the terminal voltage of the battery cell 20 drops, there is a possibility that an internal short-circuit occurs in the battery cell 20 and it becomes impossible to recharge the battery cell 20. Therefore, the protection circuit monitors a voltage of the battery cell 20. In a case of an overdischarge state, the protection circuit turns off the discharging-controlling FET to inhibit discharge.

Top Cover

The top cover 11 is attached to an end of the top portion of the battery cell 20. The battery cell 20 and the top cover 11 that is attached to an end of a top portion of the support plate 17 of the battery cell 20 are wrapped and fixed with the thermally conductive laminate sheet 30.

The top cover 11 contains the circuit board 40. The top cover 11 has a plurality of openings at positions corresponding to the plurality of contacts of the circuit board 40 so that the plurality of contacts is exposed outside. The contacts of the circuit board 40 pass through the openings of the top cover 11 and touch a device main body of an electronic device. Therefore, the battery pack 10 and the electronic-device main body are electrically connected to each other.

The top cover 11 has a first opening 11a formed at the center in a width direction, and a second opening 11b formed at a side portion in the width direction. The first opening 11a is formed at a position corresponding to a position where the temperature detection element 41 mounted on the circuit board 40 is disposed. A second portion 30b of the thermally conductive laminate sheet 30 is inserted into the first opening 11a from the outside to the inside, and is disposed in the first opening 11a. The flexible circuit board 43 connected to the circuit board 40 is inserted into the second opening 11b from the inside to the outside, and the flexible circuit board 43 protrudes outside.

Bottom Cover

The bottom cover 13 is attached to an end of the bottom portion of the battery cell 20. The bottom cover 13 disposed at the end of the bottom portion of the battery cell 20 is fixed to the battery cell 20 with, for example, an adhesive.

Thermally Conductive Laminate Sheet

The thermally conductive laminate sheet 30 has a substantially rectangular shape and is adhered to the battery cell 20 such that the thermally conductive laminate sheet 30 wraps the battery cell 20. The thermally conductive laminate sheet 30 has heat conductivity and electrical insulation. The thermally conductive laminate sheet 30 in the present exemplary embodiment corresponds to a thermally conductive member in the present disclosure.

Figure 3:
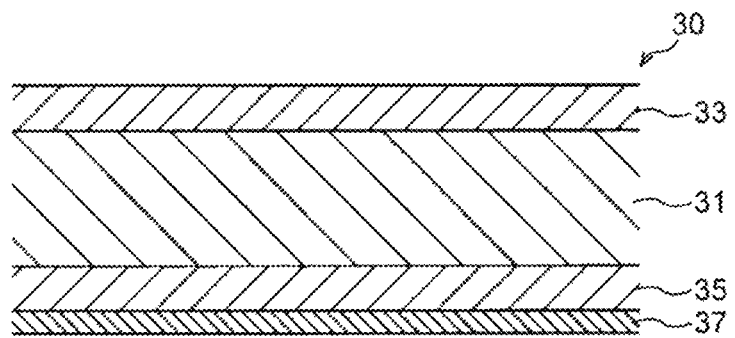
FIG. 3 is a cross-sectional view illustrating a configuration example of a thermally conductive member of the battery pack according to the exemplary embodiment.

FIG. 3 is a cross-sectional view illustrating a configuration example of the thermally conductive laminate sheet 30. The thermally conductive laminate sheet 30 includes a thermally conductive layer 33, a first electrically insulating layer 31 and a second electrically insulating layer 35 that are arranged on both surfaces of the thermally conductive layer 33, and an adhesive layer 37 disposed on a surface of the second electrically insulating layer 35.

The thermally conductive layer 33 is only required to be a layer including a material having high thermal conductivity. In the present exemplary embodiment, the thermally conductive layer 33 includes hard aluminum that is relatively inexpensive. A thin layer of the hard aluminum has high thermal conductivity. The hard aluminum has relatively high rigidity even if the hard aluminum is thin. Therefore, since the thermally conductive layer 33 includes the hard aluminum, the battery cell 20 is protected from external stresses. Furthermore, since the hard aluminum is excellent in shape retention, the battery pack 10 is more efficiently assembled, and the battery pack 10 is less likely to deform.

The first electrically insulating layer 31 and the second electrically insulating layer 35 are only required to be layers including a material having electric insulation. In the present exemplary embodiment, the first electrically insulating layer 31 and the second electrically insulating layer 35 include a polyethylene terephthalate (PET) resin.

The adhesive layer 37 is formed by applying an appropriate adhesive. The usable adhesive is not particularly limited. The adhesive layer 37 may be formed by applying, for example, an epoxy resin adhesive.

The thermally conductive laminate sheet 30 includes an electrically insulated structure including the first electrically insulating layer 31 and the second electrically insulating layer 35, and efficiently transfers heat through the thermally conductive layer 33.

Figure 4:
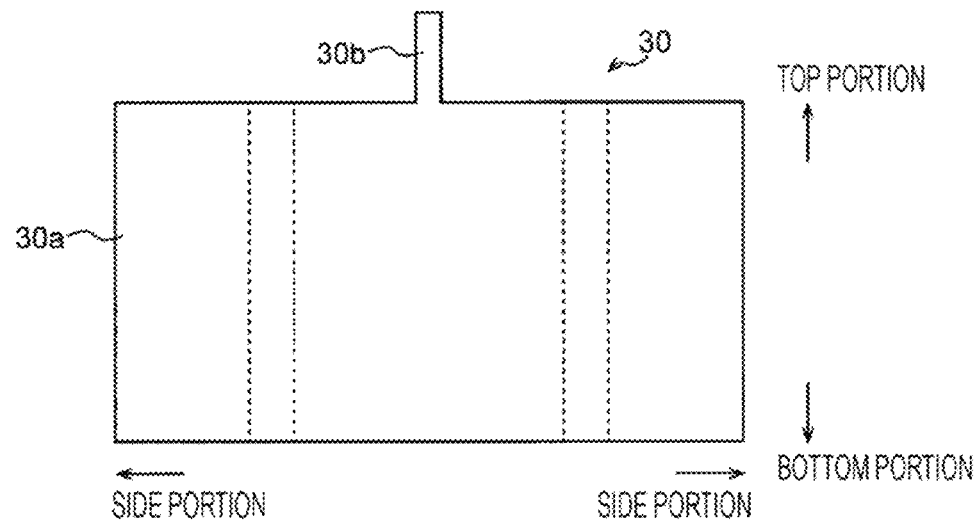
FIG. 4 is a geometry net of the thermally conductive member of the battery pack according to the exemplary embodiment.

FIG. 4 is a geometry net of the thermally conductive laminate sheet 30 used in the battery pack 10 according to the present exemplary embodiment. Longer sides of the thermally conductive laminate sheet 30 located at a top portion and a bottom portion of the thermally conductive laminate sheet 30 have substantially the same length. Lengths of such longer sides are set such that shorter sides of both side portions touch each other or face each other with a slight gap, in a state where the battery cell 20 is wrapped. Furthermore, lengths of the shorter sides of both the side portions of the thermally conductive laminate sheet 30 are set such that the lengths of the shorter sides substantially match a length of the battery cell 20 in a height direction.

The thermally conductive laminate sheet 30 has a first portion 30a serving as a main-body portion wound around the battery cell 20 and touching the battery cell 20, and the second portion 30b protruding from the first portion 30a and disposed such that the second portion 30b touches the temperature detection element 41. The second portion 30b is formed such that the second portion 30b protrudes from the longer side at the top portion. In a state where the thermally conductive laminate sheet 30 is wound around the battery cell 20, the second portion 30b is disposed at a position disposed such that the position corresponds to a position of the first opening 11a of the top cover 11.

By winding such a thermally conductive laminate sheet 30 around the battery cell 20 and adhering the thermally conductive laminate sheet 30 to the battery cell 20, the thermally conductive laminate sheet 30 is disposed over plate surfaces and the top portion (side) of the battery cell 20 that has a shape like a plate.

Temperature Detection Structure

Figure 5:
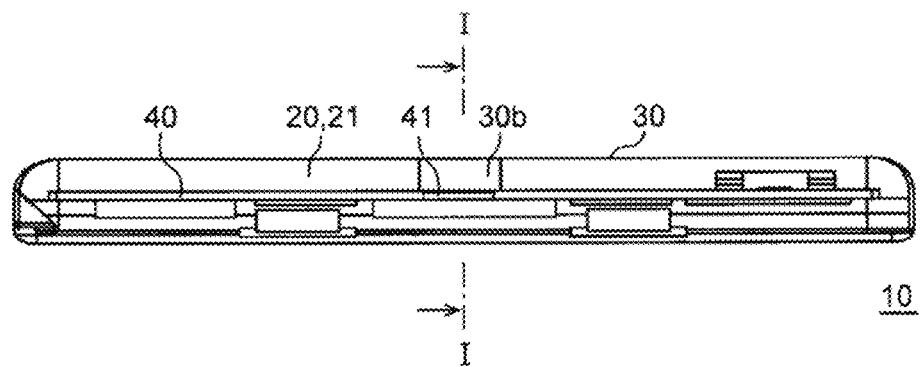
FIG. 5 is an illustration of the battery pack according to the exemplary embodiment viewed from a top-portion side.
Figure 6:
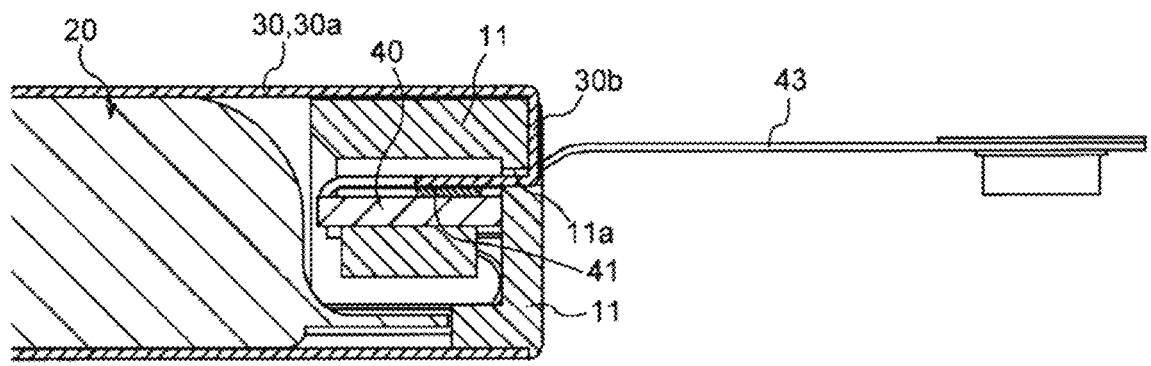
FIG. 6 is a cross-sectional view of I-I cross section in FIG. 5 viewed in a direction of arrows.
Figure 7:
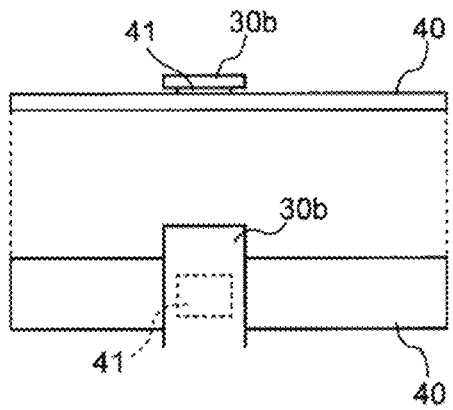
FIG. 7 includes schematic views illustrating a state where a second portion of a thermally conductive laminate sheet is joined to a temperature detection element.

Next, a temperature detection structure in the battery pack 10 according to the present exemplary embodiment will be described with reference to FIGS. 5 to 7. FIG. 5 is an illustration of the battery pack 10 viewed from a top-portion side. In FIG. 5, the top cover 11 is not illustrated. FIG. 6 is a cross-sectional view of a cross section of the battery pack 10 viewed in a width direction at a position where the temperature detection element 41 and the second portion 30b of the thermally conductive laminate sheet 30 are arranged. FIG. 6 is a drawing of I-I cross section in FIG. 5 viewed in a direction of arrows. FIG. 7 includes a side view and a plan view illustrating a state where the second portion 30b of the thermally conductive laminate sheet 30 is joined to the temperature detection element 41 mounted on the circuit board 40.

The second portion 30b of the thermally conductive laminate sheet 30 wound around and adhered to the battery cell 20 is bent along an outer surface of the top cover 11, and is inserted into and disposed in the first opening 11a formed through the top cover 11. The second portion 30b passes through the first opening 11a from the outside of the battery pack 10 to the inside of the battery pack 10.

The second portion 30b is fixed such that the second portion 30b directly touches the temperature detection element 41 within the battery pack 10. The second portion 30b may be fixed to, for example, a surface of the temperature detection element 41 with an adhesive sheet (not illustrated). At the same time, the second portion 30b may be fixed to an edge of the first opening 11a of the top cover 11. With this arrangement, it is more likely to keep the second portion 30b and the temperature detection element 41 touching each other, and it is more likely to prevent the second portion 30b and the temperature detection element 41 from being out of position. At this time, the second portion 30b may be joined to the temperature detection element 41 with a thermally conductive adhesive.

Note that, in the present specification, states in which the second portion 30b touches the temperature detection element 41 not only include a state in which the second portion 30b directly touches the temperature detection element 41, and a state in which the second portion 30b substantially directly touches the temperature detection element 41 via an adhesive sheet, but also include a state in which the second portion 30b is joined to the temperature detection element 41 with a thermally conductive material. The thermally conductive adhesive or the thermally conductive material includes, for example, a thermally conductive silicone resin, but is not limited to this example.

Preferably, the first portion 30a of the thermally conductive laminate sheet 30 is disposed at least in an area that receives heat from the outside, in a state where the battery pack 10 is installed in an electronic device. Preferably, the first portion 30a is disposed at least in, for example, an area facing a heat generating portion, such as a CPU, installed in an electronic-device main body in which the battery pack 10 is installed. With this arrangement, a temperature detected by the temperature detection element 41 surely reflects an influence of heat that the battery pack 10 receives from the outside.

In the battery pack 10 according to the present exemplary embodiment, the thermally conductive laminate sheet 30 having a high heat transfer coefficient coats a periphery of the battery cell 20. Therefore, heat generated by the battery cell 20 or heat that the battery cell 20 receives from the surroundings is more likely to be transferred to and dispersed over the entire battery pack 10 by the thermally conductive laminate sheet 30. Therefore, a temperature of the battery cell 20 is prevented from becoming extremely high locally.

Furthermore, since the second portion 30b of the thermally conductive laminate sheet 30 touches the temperature detection element 41, the temperature detection element 41 accurately detects a temperature of the thermally conductive laminate sheet 30 coating the battery cell 20. Therefore, even in a case where the battery pack 10 receives heat at a position distant from the temperature detection element 41, the temperature detection element 41 accurately detects a temperature of the battery pack 10 reflecting the received heat. Therefore, control of charging based on a temperature of the battery pack 10 is accurately performed.

1.2. Configuration Example of Electronic Device

Figure 8:
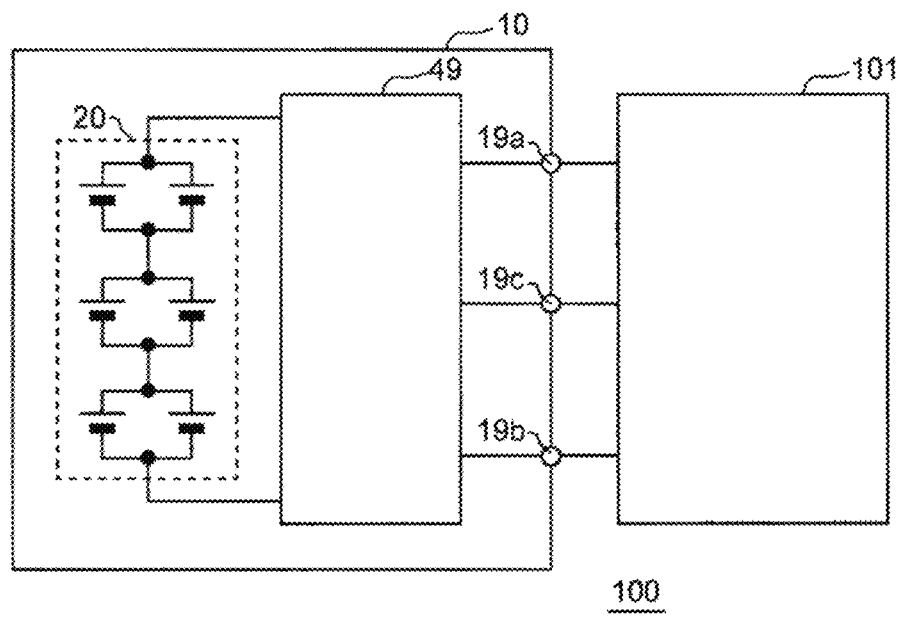
FIG. 8 is an illustration illustrating a configuration example of an electronic device according to the exemplary embodiment.

Next, an electronic device in which the battery pack 10 according to the present exemplary embodiment is installed will be described. FIG. 8 is an illustration illustrating a configuration example of an electronic device 100.

The electronic device 100 includes an electronic circuit 101 of a device main body, and the battery pack 10. The battery pack 10 includes the battery cell 20 and an electronic circuit 49, and is electrically connected to the electronic circuit 101 through a positive terminal 19a, a negative terminal 19b, and a temperature terminal 19c. The electronic device 100 is configured, for example, so that a user cannot attach and detach the battery pack 10. Note that the electronic device 100 may be configured so that a user can attach and detach the battery pack 10.

In a case where the battery pack 10 cannot be attached and detached, the positive terminal 19a, the negative terminal 19b, and the temperature terminal 19c of the battery pack 10 are connected to a positive terminal, a negative terminal, and a temperature terminal of the electronic circuit 101 of the device main body, respectively. When the battery pack 10 is charged, the positive terminal 19a, the negative terminal 19b, and the temperature terminal 19c of the battery pack 10 are connected to a positive terminal, a negative terminal, and a temperature terminal of a charger (not illustrated), respectively.

Examples of the electronic device 100 include a mobile phone, such as a smartphone, a tablet computer, a notebook personal computer, a personal digital assistant (PDA), a display device, a navigation system, an electronic book, an electronic dictionary, a music player, and the like. However, the electronic device 100 is not limited to these examples.

The electronic circuit 101 includes, for example, a central processing unit (CPU), a peripheral logic unit, an interface unit, a storage unit, and the like, and controls the entire electronic device 100.

The battery pack 10 is required to be thin and small for such an electronic device 100, particularly for an electronic device configured to be thin. Therefore, as in the battery pack 10 according to the present exemplary embodiment, the circuit board 40 on which the temperature detection element 41 is mounted is disposed on one side (top portion) of the battery cell 20 that has a shape like a plate. In a case where such a battery pack 10 is installed in the electronic device 100, a circuit board on which the electronic circuit 101 of the electronic-device main body is formed is often disposed at a position facing a plate surface of the battery cell 20 that has a shape like a plate.

Since the electronic circuit 101 includes heat-generating components, such as a CPU, heat generated in the electronic circuit 101 is transferred to the battery cell 20, and the battery cell 20 is heated. At this time, in a case where a member is not disposed that transfers heat to the temperature detection element 41 on the circuit board 40 of the battery pack 10, there is a possibility that there is a difference between a temperature near the battery pack 10 facing a heat generating portion, such as the CPU, and a temperature at a position where the temperature detection element 41 is disposed.

For example, in a case where a battery cell includes a protective insulating resin tape on the outer surface and the protective insulating resin tape protects the battery cell from external stresses, the battery cell does not include a means that transfers, to a temperature detection element, heat that the battery cell receives at a position distant from a position where the temperature detection element is disposed.

Figure 9:
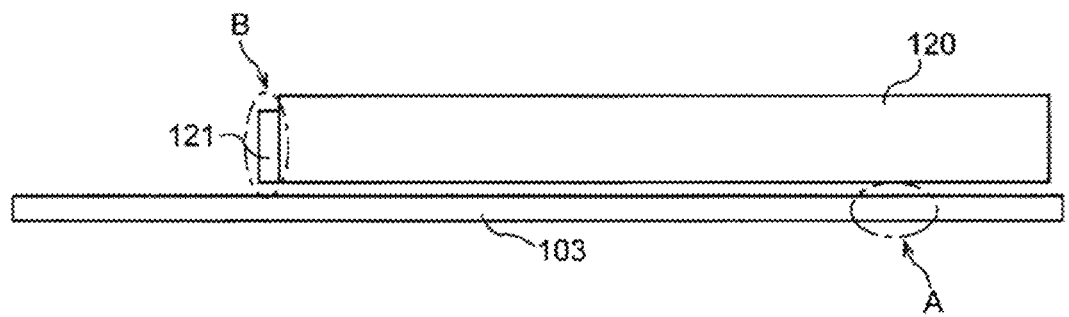
FIG. 9 is a schematic view illustrating a configuration example of an electronic device in which a difference occurs between a temperature at a position where a battery cell receives heat and a temperature at a position where a temperature detection element is disposed.

FIG. 9 is a schematic view illustrating a state in which a battery cell 120 including no means for transferring heat to a temperature detection element 121 is mounted adjacent to a circuit board 103 on which the electronic circuit 101 of the electronic device 100 is formed. In this example, a difference occurs between a temperature at point A where the battery cell 120 receives heat from a heat generating portion and a temperature at point B where the temperature detection element 121 is located.

Figure 10:
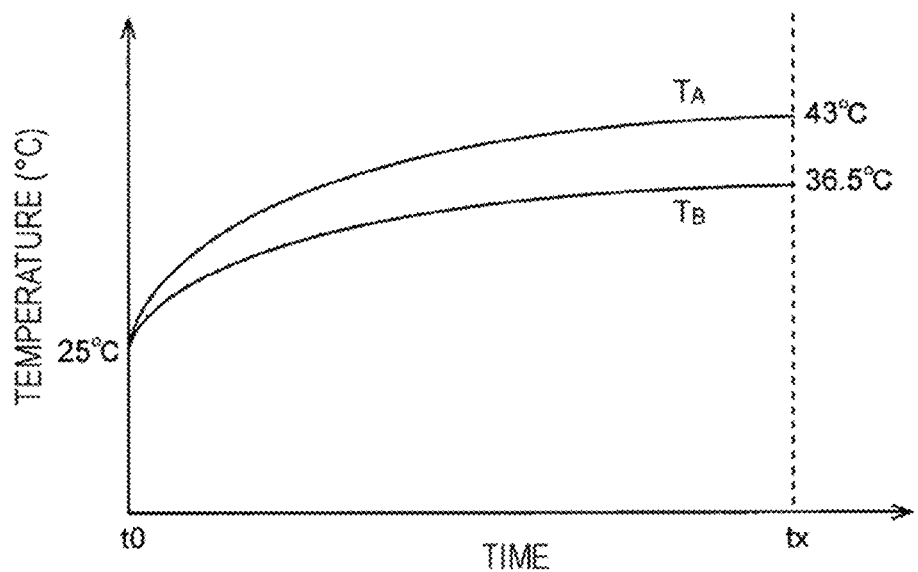
FIG. 10 is an illustration illustrating changes in temperatures when the electronic device having the configuration example illustrated in FIG. 9 is charged.

FIG. 10 is an illustration illustrating changes in temperature $T_A$ at point A and temperature $T_B$ at point B when an electronic device having the configuration example illustrated in FIG. 9 is charged. In this example, temperature $T_A$ at point A and temperature $T_B$ at point B at charging start time t0 are both 25° C. In contrast, although temperature $T_A$ at point A is 43 degrees at charging completion time tx, temperature $T_B$ at point B is 36.5° C. at charging completion time tx. The difference between the temperatures is 6.5° C. If such a difference between the temperatures occurs, controls, such as stopping or suspending charging, and lowering a voltage at a time of charging on the basis of a temperature of the battery cell 120, are not appropriately performed. There is a possibility that safety of the battery cell 120 decreases or the battery cell 120 deteriorates.

In contrast, in the electronic device 100 according to the present exemplary embodiment, the thermally conductive laminate sheet 30 transfers heat to the temperature detection element 41 even in a case where the battery cell 20 receives heat at a position distant from the temperature detection element 41. The temperature detection element 41 accurately detects a temperature.

Figure 11:
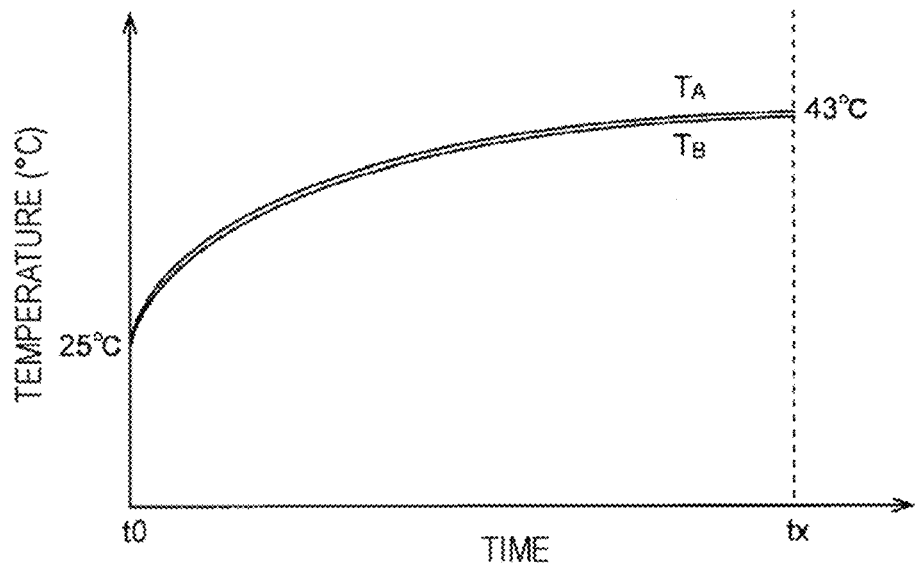
FIG. 11 is an illustration illustrating changes in temperatures when the electronic device according to the exemplary embodiment is charged.

FIG. 11 is an illustration illustrating changes in temperature $T_A$ at point A and temperature $T_B$ at point B when the electronic device 100 according to the present exemplary embodiment is charged. In the electronic device 100 according to the present exemplary embodiment, temperature $T_A$ at point A and temperature $T_B$ at point B change in the same manner from charging start time t0 to charging completion time tx. At charging completion time tx, no difference occurs between a temperature at point A and a temperature at point B.

Therefore, controls, such as stopping or suspending charging, and lowering a voltage at a time of charging on the basis of a temperature of the battery cell 20, are appropriately performed in the electronic device 100 according to the present exemplary embodiment. Safety of the battery cell 20 is secured, and deterioration of the battery cell 20 is decreased.

2. Second Exemplary Embodiment

A configuration example of a battery pack according to a second exemplary embodiment of the present disclosure will be described. The battery pack according to the present exemplary embodiment is different from the battery pack 10 according to the first exemplary embodiment in that the battery pack does not include a temperature detection element. Furthermore, in the battery pack according to the present exemplary embodiment, a thermally conductive laminate sheet is configured to transfer heat to a temperature detection element installed in an electronic-device main body.

Figure 12:
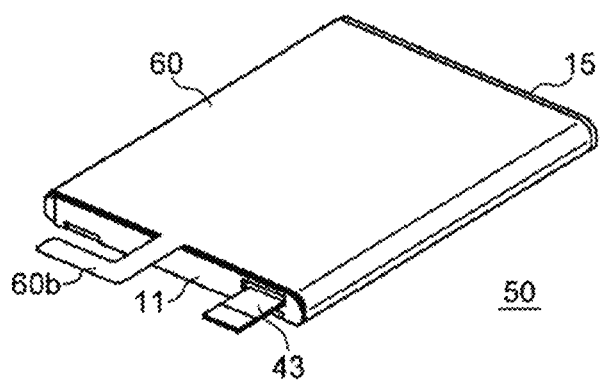
FIG. 12 is a perspective view illustrating an appearance of a battery pack according to a second exemplary embodiment of the present disclosure.
Figure 13:
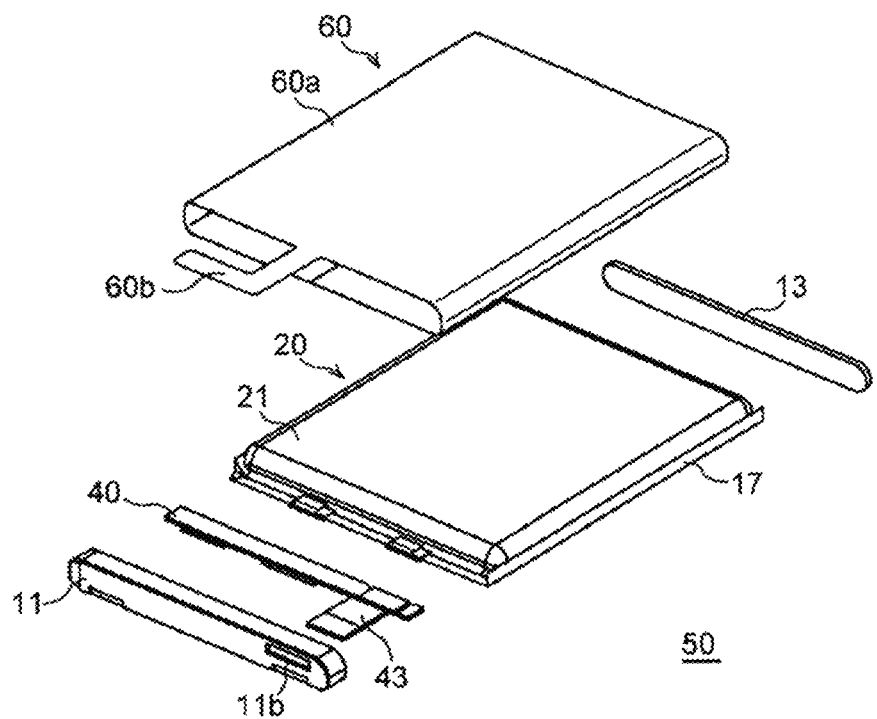
FIG. 13 is an exploded perspective view illustrating a configuration example of the battery pack according to the exemplary embodiment.
Figure 14:
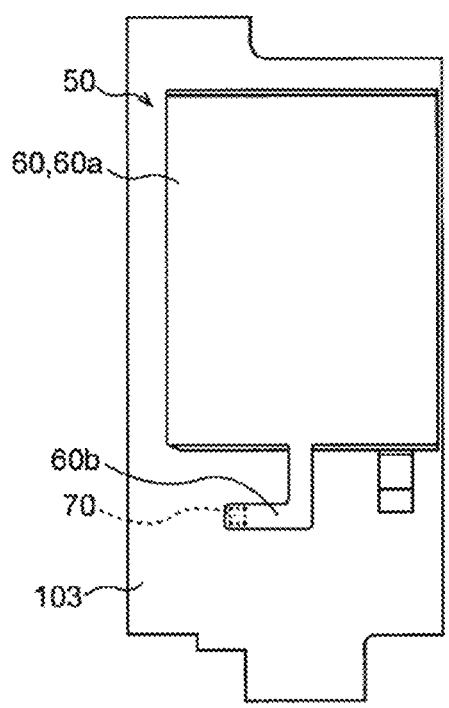
FIG. 14 is a schematic view illustrating a state where the battery pack according to the exemplary embodiment is disposed on a circuit board of an electronic-device main body.

A configuration example of a battery pack 50 according to the present exemplary embodiment will be described with reference to FIGS. 12 to 14. FIG. 12 is a perspective view illustrating an appearance of the battery pack 50. FIG. 13 is an exploded perspective view illustrating the configuration example of the battery pack 10. FIG. 14 is a schematic view illustrating a state where the battery pack 50 is disposed on a circuit board 103 of an electronic-device main body.

The battery pack 50 according to the present exemplary embodiment is preliminarily installed in an electronic device, and is configured so that a user cannot attach or detach the battery pack 50 to or from the electronic device. In the battery pack 50 according to the present exemplary embodiment, no temperature detection element is mounted on a circuit board 40 of the battery pack 50. Instead, a temperature detection element 70 is mounted on the circuit board 103 of the electronic-device main body. Furthermore, a top cover 11 does not have a first opening 11a that the top cover 11 of the battery pack 10 according to the first exemplary embodiment has.

A thermally conductive laminate sheet 60 has a first portion 60a serving as a main-body portion wound around a battery cell 20 and touching the battery cell 20, and a second portion 60b protruding from the first portion 60a and disposed such that the second portion 60b touches the temperature detection element 70. The second portion 60b is formed such that the second portion 60b protrudes from a longer side of a top portion. In the illustrated example, the second portion 60b is formed in a shape like a letter L, and has a tip portion that touches the temperature detection element 70 on the circuit board 103 of the electronic-device main body.

The second portion 60b may be fixed to a surface of the temperature detection element 70 with an adhesive sheet (not illustrated). Alternatively, the second portion 60b may be joined to the temperature detection element 70 with a thermally conductive material or a thermally conductive adhesive.

In the battery pack 50 according to the present exemplary embodiment, the thermally conductive laminate sheet 60 having a high heat transfer coefficient coats a periphery of the battery cell 20. Therefore, heat generated by the battery cell 20 or heat that the battery cell 20 receives from the surroundings is more likely to be transferred to and dispersed over the entire battery pack 50 by the thermally conductive laminate sheet 60. Therefore, a temperature of the battery cell 20 is prevented from becoming extremely high locally.

Furthermore, since the second portion 60b of the thermally conductive laminate sheet 60 touches the temperature detection element 70 on the circuit board 103 of the electronic-device main body, the temperature detection element 70 accurately detects a temperature of the thermally conductive laminate sheet 60 coating the battery cell 20. Therefore, even in a case where the battery pack 50 receives heat at a position distant from the temperature detection element 70, the temperature detection element 70 accurately detects a temperature of the battery pack 50 reflecting the received heat. Therefore, control of charging based on a temperature of the battery pack 50 is accurately performed.

Furthermore, in an electronic device in which the battery pack 50 according to the present exemplary embodiment is installed, the thermally conductive laminate sheet 60 transfers heat to the temperature detection element 70 even in a case where the battery cell 20 receives heat at a position distant from the temperature detection element 70. The temperature detection element 70 accurately detects a temperature. Therefore, controls, such as stopping or suspending charging, and lowering a voltage at a time of charging on the basis of a temperature of the battery cell 20, are appropriately performed. Safety of the battery cell 20 is secured, and deterioration of the battery cell 20 is decreased.

3. Third Exemplary Embodiment

A configuration example of a battery pack according to a third exemplary embodiment of the present disclosure will be described. The battery pack according to the present exemplary embodiment is different from the battery packs 10 and 50 according to the first and second exemplary embodiments in that a thermally conductive laminate sheet does not have a second portion protruding from a top portion.

Figure 15:
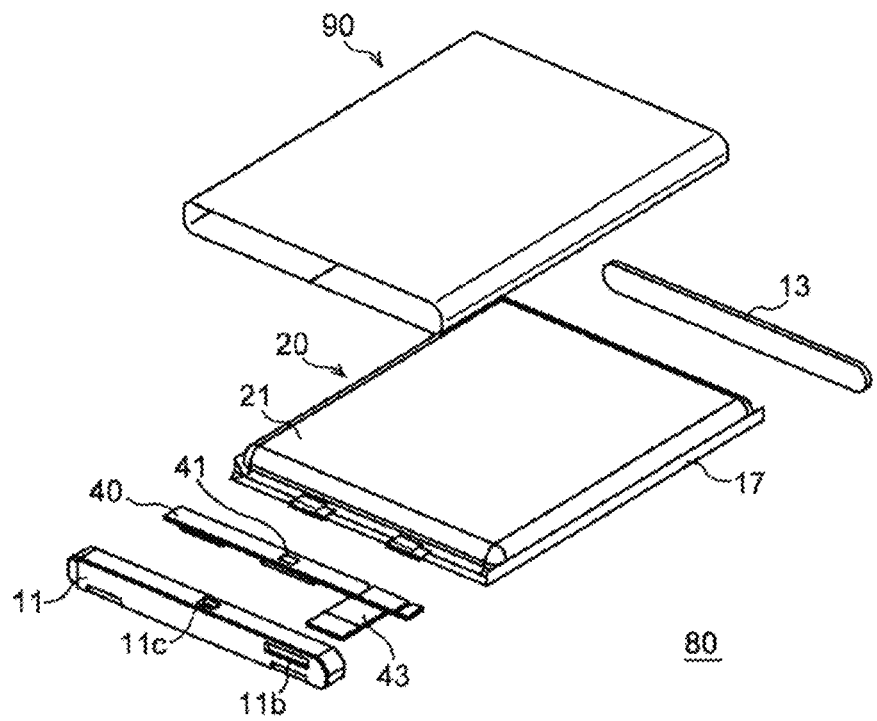
FIG. 15 is a perspective view illustrating an appearance of a battery pack according to a third exemplary embodiment of the present disclosure.
Figure 16:
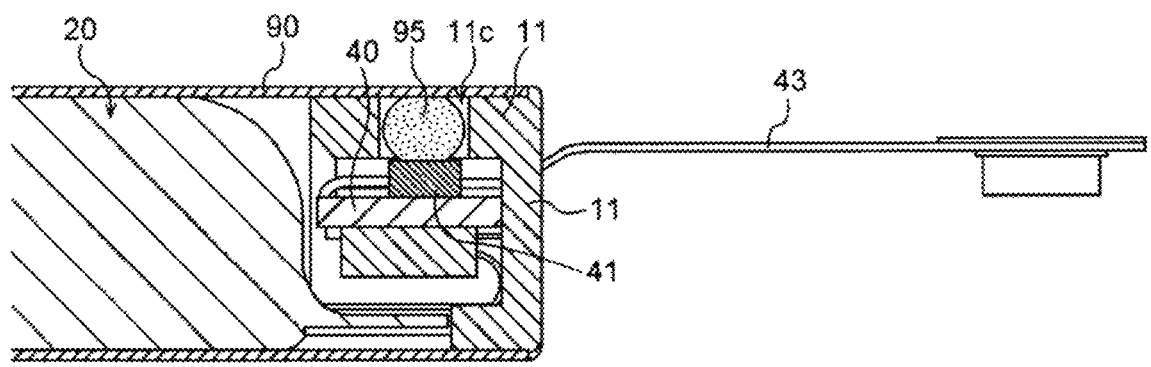
FIG. 16 is a cross-sectional view of a cross section of the battery pack according to the exemplary embodiment viewed in a width direction at a position where a temperature detection element is disposed.

A configuration example of a battery pack 80 according to the present exemplary embodiment will be described with reference to FIGS. 15 and 16. FIG. 15 is an exploded perspective view illustrating the configuration example of the battery pack 80. FIG. 16 is a cross-sectional view of a cross section of the battery pack 80 viewed in a width direction at a position where a temperature detection element 41 is disposed, and corresponds to FIG. 6 described above.

In the battery pack 80 according to the present exemplary embodiment, the temperature detection element 41 is mounted on a circuit board 40, similarly to the battery pack 10 according to the first exemplary embodiment. Furthermore, a third opening 11c is formed at the center of a top cover 11 in a width direction of the top cover 11. The third opening 11c is formed not through a side of the top cover 11 facing a top-portion side or a bottom-portion side, but is formed through a side of the top cover 11 on which a thermally conductive laminate sheet 90 is disposed. The third opening 11c is formed such that the third opening 11c corresponds to a position where the temperature detection element 41 is disposed. In a state where the circuit board 40 and the top cover 11 are attached to a battery cell 20, the temperature detection element 41 is exposed outside through the third opening 11c.

The thermally conductive laminate sheet 60 includes only a main-body portion wound around and adhered to the battery cell 20. The thermally conductive laminate sheet 60 is disposed such that the thermally conductive laminate sheet 60 coats the battery cell 20 and covers at least the third opening 11c of the top cover 11. A thermally conductive material 95, such as a thermally conductive silicone resin, is disposed within the third opening 11c. The thermally conductive material 95 transfers heat from the thermally conductive laminate sheet 60 to the temperature detection element 41.

In the battery pack 80 according to the present exemplary embodiment, the thermally conductive laminate sheet 90 having a high heat transfer coefficient coats a periphery of the battery cell 20. Therefore, heat generated by the battery cell 20 or heat that the battery cell 20 receives from the surroundings is more likely to be transferred to and dispersed over the entire battery pack 50 by the thermally conductive laminate sheet 90. Therefore, a temperature of the battery cell 20 is prevented from becoming extremely high locally.

Furthermore, since the thermally conductive material 95 disposed within the third opening 11c of the top cover 11 transfers heat of the thermally conductive laminate sheet 90 to the temperature detection element 41 on the circuit board 40, the temperature detection element 41 accurately detects a temperature of the thermally conductive laminate sheet 90 coating the battery cell 20. Therefore, even in a case where the battery pack 80 receives heat at a position distant from the temperature detection element 41, the temperature detection element 41 accurately detects a temperature of the battery pack 80 reflecting the received heat. Therefore, control of charging based on a temperature of the battery pack 80 is accurately performed.

Furthermore, in an electronic device in which the battery pack 80 according to the present exemplary embodiment is installed, the thermally conductive laminate sheet 90 transfers heat to the temperature detection element 41 even in a case where the battery cell 20 receives heat at a position distant from the temperature detection element 41. The temperature detection element 41 accurately detects a temperature. Therefore, controls, such as stopping or suspending charging, and lowering a voltage at a time of charging on the basis of a temperature of the battery cell 20, are appropriately performed. Safety of the battery cell 20 is secured, and deterioration of the battery cell 20 is decreased.

As described above, the preferred exemplary embodiments of the present disclosure have been described in detail with reference to the accompanying drawings, but the technical scope of the present disclosure is not limited to such examples. It is apparent that those having ordinary knowledge in the technical field of the present disclosure can conceive various changes or modifications within the scope of the technical idea described in the claims. It is understood that the various changes or modifications also naturally belong to the technical scope of the present disclosure.

For example, in the above exemplary embodiments, the first portion of the thermally conductive laminate sheet is adhered to the battery cell so that the first portion wraps the entire battery cell. However, the technology of the present disclosure is not limited to such an example. For example, the first portion of the thermally conductive laminate sheet is only required to be disposed in an area including at least a portion facing a heat generating portion, such as a CPU, installed in an electronic-device main body in which the battery pack is installed. Even in a case where the first portion is disposed in this manner, the temperature detection element detects a temperature of the battery pack reflecting an influence of heat that the battery pack receives from the electronic-device main body.

Furthermore, in the above exemplary embodiments, the protection circuit of the battery cell is mounted on the circuit board of the battery pack. However, the technology of the present disclosure is not limited to such an example. For example, the protection circuit of the battery cell may be installed in an electronic-device-main-body side.

Furthermore, effects described in the present specification are merely illustrative or exemplary, and are not limiting. That is, in addition to or instead of the above effects, the technology according to the present disclosure may have other effects that are obvious to those skilled in the art from the description in the present specification.

Note that the following configurations also belong to the technical scope of the present disclosure.

(1) A battery pack including:
a battery cell;
a temperature detection element; and
a thermally conductive member transferring heat of the battery cell to the temperature detection element.

(2) The battery pack according to the item (1), in which the thermally conductive member is disposed in an area including at least a portion facing a heat generating portion of an electronic-device main body in which the battery pack is installed.

(3) The battery pack according to the item (1) or (2), in which at least part of the thermally conductive member coats a periphery of the battery cell.

(4) The battery pack according to any one of the items (1) to (3), in which the thermally conductive member is a thermally conductive sheet including a thermally conductive layer, and a first electrically insulating layer and a second electrically insulating layer that are arranged on both surfaces of the thermally conductive layer.

(5) The battery pack according to any one of the items (1) to (4), in which the battery cell has a shape like a plate, the temperature detection element is disposed on a side of the battery cell having a shape like a plate, and the thermally conductive member is disposed over at least a plate surface and the side of the battery cell.

(6) The battery pack according to the item (5), in which the temperature detection element is mounted on a circuit board electrically connected to the battery cell, and is disposed on the side of the battery cell having a shape like a plate.

(7) The battery pack according to any one of the items (1) to (6), in which the thermally conductive member directly touches the temperature detection element.

(8) The battery pack according to any one of the items (1) to (6), in which the thermally conductive member touches the temperature detection element via a thermally conductive material.

(9) An electronic device according to any one of the items (1) to (8), in which the thermally conductive member has a first portion touching the battery cell, and a second portion protruding from the first portion and touching the temperature detection element.

(10) An electronic device including:
a battery pack including a battery cell;
a temperature detection element; and
a thermally conductive member transferring heat of the battery cell to the temperature detection element.

(11) The electronic device according to the item (10), in which the thermally conductive member has a first portion touching the battery cell, and a second portion protruding from the first portion and touching the temperature detection element.

(12) The electronic device according to the item (10) or (11), in which the battery pack includes the temperature detection element.

(13) The electronic device according to the item (10) or (11), in which an electronic-device-main-body side in which the battery pack is installed includes the temperature detection element.

REFERENCE SIGNS LIST 10, 50, 80 Battery pack
11 Top cover
11a First opening
20 Battery cell
21 Battery element
30, 60, 90 Thermally conductive laminate sheet (Thermally conductive member)
30a, 60a First portion
30b, 60b Second portion
31 First electrically insulating layer
33 Thermally conductive layer
35 Second electrically insulating layer
40 Circuit board
41, 70 Temperature detection element
100 Electronic device
103 Circuit board

The invention claimed is:

1. A battery pack comprising:
a battery cell inside the battery pack;
a temperature detector inside the battery pack; and
a thermally conductive member to transfer heat of the battery cell to the temperature detector,
wherein the thermally conductive member is wrapped around the battery cell such that opposite ends of the battery cell are exposed,
wherein a first part of a second portion of the thermally conductive member is exposed to outside the battery pack at one of the exposed opposite ends of the battery cell, and
wherein a second part of the second portion of the thermally conductive member touches a portion of the temperature detector and is inside the battery pack.

2. The battery pack according to claim 1, wherein the thermally conductive member is disposed in an area including at least a portion facing a heat generating portion of an electronic-device main body in which the battery pack is installed.

3. The battery pack according to claim 1, wherein at least part of the thermally conductive member coats a periphery of the battery cell.

4. The battery pack according to claim 1, wherein the thermally conductive member is a thermally conductive sheet including a thermally conductive layer, and a first electrically insulating layer and a second electrically insulating layer that are arranged on both surfaces of the thermally conductive layer.

5. The battery pack according to claim 1, wherein the battery cell is in the form of a plate, the temperature detector is disposed on a side of the battery cell at said one of the exposed opposite ends of the battery cell, and the thermally conductive member is disposed over at least a plate surface and the side of the battery cell at said one of the exposed opposite ends of the battery cell.

6. The battery pack according to claim 5, wherein the temperature detector is mounted on a circuit board electrically connected to the battery cell, and is disposed on the side of the battery cell at said one of the exposed opposite ends of the battery cell.

7. The battery pack according to claim 1, wherein the thermally conductive member directly touches the temperature detector.

8. The battery pack according to claim 1, wherein the first part of the second portion of the thermally conductive member that is exposed to outside the battery pack is a bent portion that contacts a top cover of the battery pack.

9. An electronic device comprising:
a battery pack including a battery cell inside the battery pack;
a temperature detector inside the battery pack; and a thermally conductive member to transfer heat of the battery cell to the temperature detector, wherein the thermally conductive member is wrapped around the battery cell such that opposite ends of the battery cell are exposed, wherein a first part of a second portion of the thermally conductive member is exposed to outside the battery pack at one of the exposed opposite ends of the battery cell, and wherein a second part of the second portion of the thermally conductive member touches a portion of the temperature detector and is inside the battery pack.

10. The electronic device according to claim 9, wherein the thermally conductive member has a first portion touching the battery cell, and the second portion protrudes from the first portion and touches the temperature detector.

11. The electronic device according to claim 9, wherein the battery pack includes the temperature detector.

12. The electronic device according to claim 9, wherein the first part of the second portion of the thermally conductive member that is exposed to outside the battery pack is a bent portion that contacts a top cover of the battery pack.

\* \* \* \* \*